Patented Nov. 24, 1925.

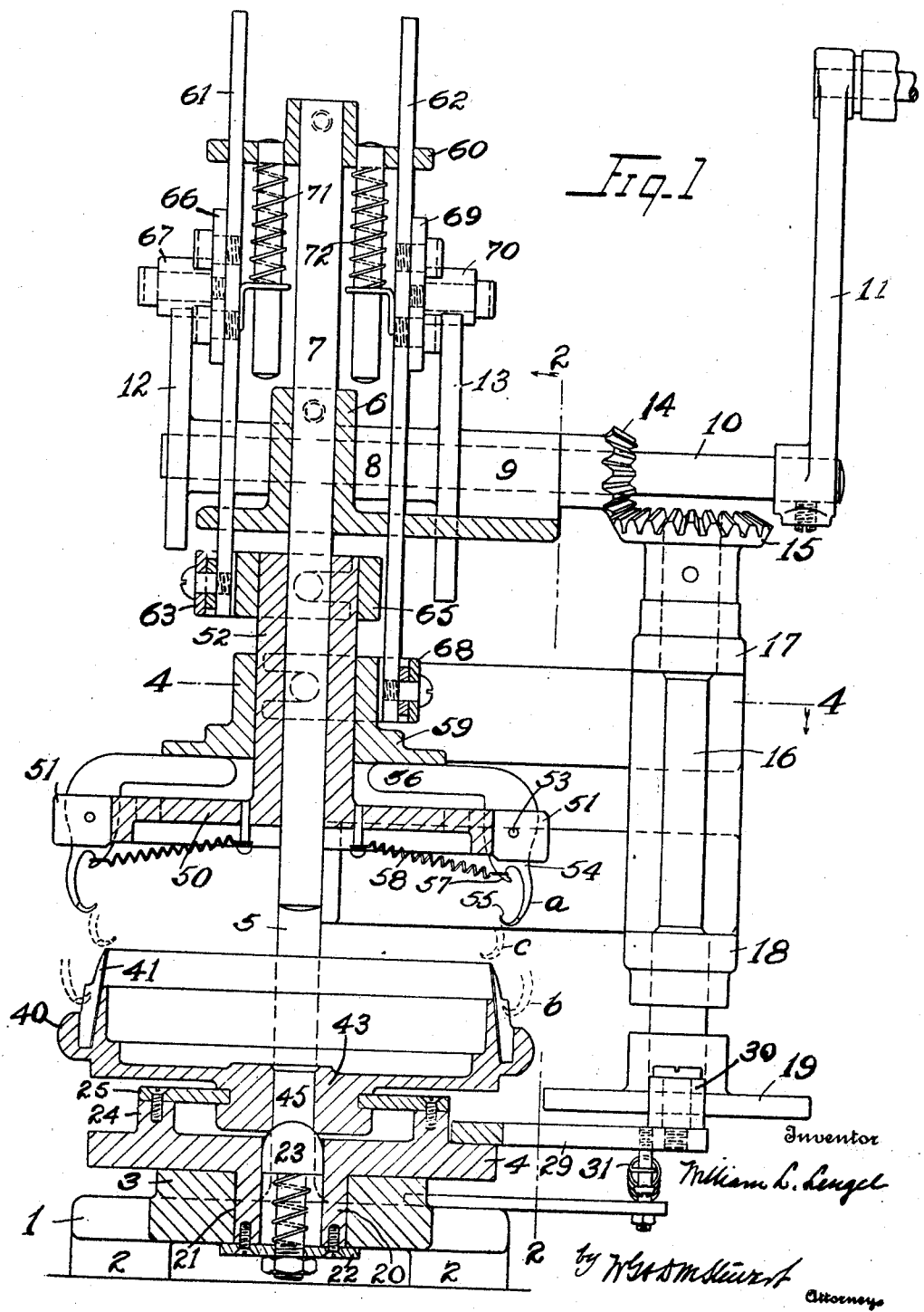

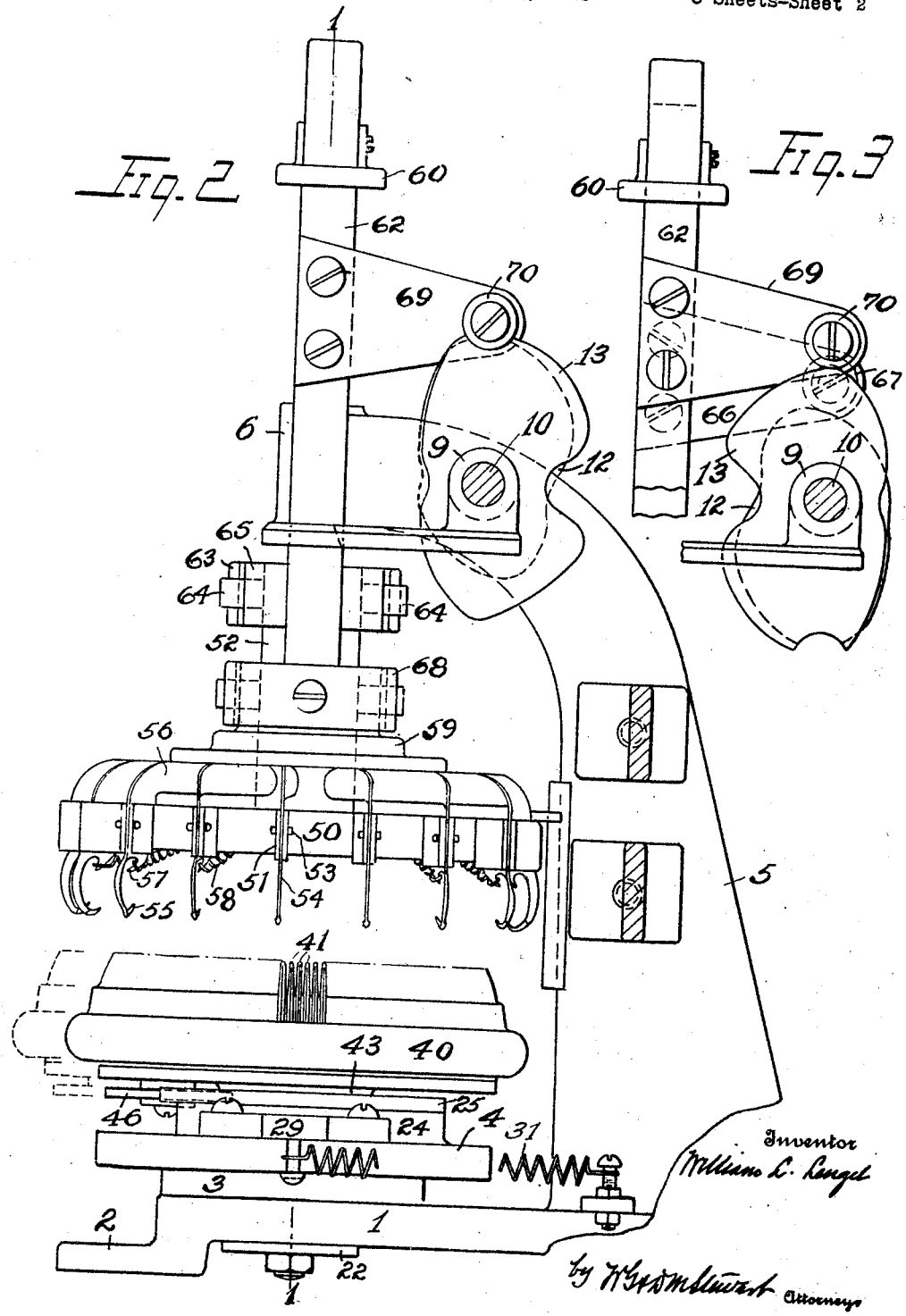

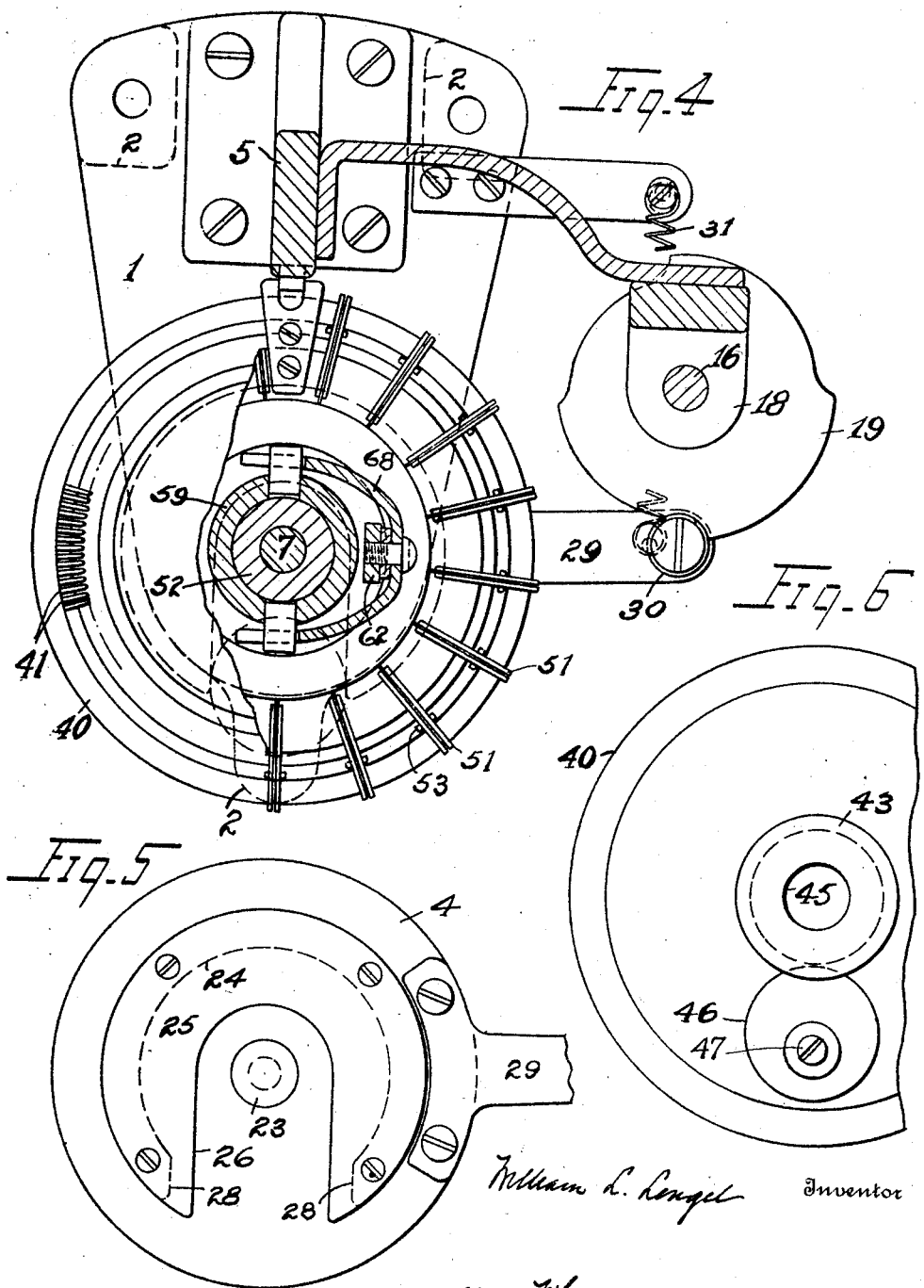

1,562,895

UNITED STATES PATENT OFFICE.

WILLIAM L. LENGEL, OF READING, PENNSYLVANIA, ASSIGNOR TO THE NOLDE & HORST CO., OF READING, PENNSYLVANIA, A CORPORATION OF PENNSYLVANIA.

LOOP DOUBLER.

Application filed July 14, 1921. Serial No. 484,628.

*To all whom it may concern:*

Be it known that I, WILLIAM L. LENGEL, a citizen of the United States, residing at Reading, in the county of Berks and State of Pennsylvania, have invented certain new and useful Improvements in Loop Doublers, of which the following is a specification.

My invention relates to loop doubling mechanism of the type set forth in Robinson Patent No. 1,021,800, dated April 2, 1912, for automatically effecting the transfer of hosiery tops through the medium of a quill ring; and it consists in the improved mechanism for such purpose hereinafter fully described in connection with the accompanying drawings and the novel features of which are clearly defined in the subjoined claims.

Fig. 1 is a sectional elevation, on the line 1—1 of Fig. 2, of a machine embodying the invention; different positions assumed by the loop-picker devices being indicated in dotted lines.

Fig. 2 is an elevation taken at right angles to Fig. 1; and Fig. 3 is a corresponding fragmentary view indicating different positions of the picker cams and operating connections.

Fig. 4 is a sectional plan view on the line 4—4 of Fig. 1.

Fig. 5 is a separate plan view of the rotatable quill ring support.

Fig. 6 is a bottom plan view of a quill ring.

Referring specifically to the drawings which indicate an embodiment of my invention, 1 represents a base or support plate elevated as shown upon short feet 2 by means of which it rests upon and may be secured to a suitable table or bench. A raised boss 3 on the plate forms a bearing seat for a rotatable quill ring support 4, and a bracket 5 secured to said plate, fixedly carries in its overhanging upper end 6 a vertical rod 7 in substantial axial alinement with the rotatable support 4. The bracket 5 also carries in its upper end in spaced bearings 8, 9, a horizontal shaft 10. This shaft 10 is provided with a crank handle 11 to rotate the same, disc cams 12 and 13 to actuate the picker hooks as more fully hereinafter described, and a gear 14 in mesh with a gear 15 on a vertical shaft 16 mounted in bearings 17, 18 projecting horizontally from the bracket 5; the shaft 16 carrying a quill rotating cam 19.

The quill support 4 as shown, seats upon the boss 3 and is rotatably secured by means of a hub portion 20 engaging an aperture 21 in the base 1 and is retained therein by a cap 22 secured to the hub and bearing against the underside of the base. The hub 20 is shown as centrally apertured for a spring-projected centering pin 23 adapted to center the quill ring. The upper side of the support 4 is formed with a semi-circular flange 24 to which a quill-engaging plate 25 is secured, said plate having a radial slot 26 between the portions 28, 28 of the flange 24. A rigid arm 29 provided with an end roller 30 is adapted to contact with the edge of cam 19, against which it is normally held by a spring 31; said cam reciprocatingly rotating the support 4 in cooperation with the picker hook movements hereinafter described.

The quill ring 40 is of well known construction, having the usual circular series of quill points 41 held therein, the number of points corresponding with the number of needles in the particular machine with which it is employed. In order to securely hold the ring in position on the support 4, I provide it as shown with a circumferentially grooved central hub 43 adapted to slidably fit the radial slot 26 (Fig. 5); and with a central aperture 45 to engage the centering pin 23. To lock the ring against independent rotation upon the support 4, after required accurate adjustment of the points in relation to the picker hooks 55, I provide an eccentric disc 46 (Figs. 2, 4 and 6) secured to the under side of the quill ring 40 and adapted to engage in the slot 26, the turning of said eccentric disc varying the circumferential position of the quill points, and when secured in adjusted position (by set screw 47 indicated) permitting the quill device to be freely removed and replaced as thus set.

Carried on the fixed rod 7 above the quill ring 40, is a picker hook carrier 50. This is shown as a circular plate having a series of radially slotted extensions 51 and a central sleeve 52 slidably engaging the rod 7. Pivoted at 53 in the extensions 51 are the picker hooks 54, each of which are preferably formed with a depending hooked point 55 adapted to engage the fabric loops, an inwardly extending right-angled upper portion 56 overhanging the carrier, and a spring connection 57. Springs 58 normally swing the hooks inward on their pivots 53 against the action of a sliding sleeve 59 vertically movable on the carrier sleeve 52 and bearing on the hook extensions 56.

Fixed to the upper end of the rod 7 above bracket head 6, is shown a guide plate 60 forming the top support for two vertically slidable bars 61, 62. Bar 61 is pivoted at its lower end to a forked member 63 engaging trunnions 64, 64 on a collar 65 secured to picker carrier sleeve 52; and extending rearwardly from a mid portion of said bar is a bracket 66 having a roller 67 adapted to ride upon cam 12. Bar 62 is similarly connected to sleeve 59 through forked member 68, and has a bracket 69 with roller 70 riding upon cam 13. Springs 71, 72 as shown, normally maintain the rollers 67 and 70 in contact respectively with cams 12 and 13. These cams 12 and 13 respectively control the vertical and radial movement of the picker hooks, while cam 19 controls the reciprocation of the quill ring; said cams being cooperatively driven by the intermeshing of drive shaft 10 with shaft 16 through gears 14 and 15.

The operation is as follows: The turning of the shaft 10 cooperatively rotates the cams 12, 13 and 19, which are so shaped and timed as to perform the following cycle of operations for each rotation of the shaft, reference being had particularly to Fig. 1 in which various positions of the picker hooks are indicated in dotted lines:

(1) From the raised position indicated by letter a, Fig. 1, the pickers are moved straight down to position b by the vertical lowering of carrier 50. (2) The pickers are swung into the grooved quill points, position b, by action of springs 58 as shown, upon the raising of sleeve 59. (3) The pickers are raised with an inward swing, carrying the loop from the quill points, to position c, by upward movement of carrier 50 and continued action of springs 58. (4) The quill ring is turned one point (to right to engage next point with picker), by action of cam 19 on arm 29 of quill support 4. (5) The pickers lower again, transferring removed loops to next quill points, and swing outwardly to position b, by first lowering movement of carrier 50 and then independent lowering movement of sleeve 59 acting on the hook shank extensions 56. (6) The pickers are raised to position a, by vertical movement of carrier 50. (7) The quill ring is turned two points to left by cam 19, so as to position the pickers above adjacent looped quill points.

The cycle of operations performed by one rotation of the shaft 10 causing reverse loop engaging swings of said picker hook upon two quill points presented thereto as above described, transfers one loop, or a series of loops corresponding with the number of pickers employed, to the left. The next rotation of the shaft 10 is adapted to repeat the cycle of operations described above for transferring loops to the right instead of the left, so that by two turns of the shaft 10, loops from adjacent quill points will be respectively transferred to quill points to the left and the right, to provide for a double drop stitch. The mechanism specifically set forth, may obviously be readily modified without departing from the invention as defined in the claims.

What I claim is:

1. In a loop doubler comprising a quill ring provided with a circular series of loop holding quill points and means for imparting determined rotative movements thereto; a picker carrier axially reciprocable toward and away from said ring and provided with a radially movable loop-transferring picker hook; and separate cam mechanism for respectively reciprocating said carrier and positively actuating said hook to effect reverse loop-engaging swings of the latter in successive carrier reciprocations.

2. In a loop doubler comprising loop transferring picker mechanism: a reciprocatively mounted quill ring support, a quill ring removably carried thereby, means for centering said ring, and ring-carried adjustable locking means for rotatably positioning said ring points relative to the picker mechanism.

3. In a loop doubler comprising loop picker mechanism; a quill ring having a circumferentially grooved hub with a centering aperture, and a rotatively mounted quill ring support provided with a radially-slotted groove-engaged plate, and a centering pin adapted to enter said aperture.

4. In a loop doubler comprising loop picker mechanism; a quill ring having a circumferentially grooved hub with a centering aperture, and a rotatively mounted quill ring support provided with a radially-slotted grooved-engaged plate, and a centering pin adapted to enter said aperture; said quill ring carrying an adjustable plate-engaging positioning device.

5. In a loop doubler mechanism comprising a rotatably carried quill ring, an axially reciprocated picker carrier provided with a circumferential series of radially movable picker hooks normally spring-pressed inward, and carrier-supported means axially movable independently to radially swing said hooks outward, said springs and carrier supported means acting on said picker hooks to respectively effect loop engaging and disengaging movements thereto in successive carrier reciprocations.

6. In a loop doubler comprising a rotatable quill ring provided with a circular series of loop holding quill points, a fixed rod centrally supported above said ring, a picker carrier axially slidable on said rod and provided with radially movable loop transferring picker hooks, a picker-actuating sliding sleeve on said rod, and cooperative means adapted to receiprocate said carrier, to coincidentally actuate said hook reversely in loop engaging and disengaging swings in successive downward movements of said carrier, and to partly turn said ring on its axis to present different determined points thereof to said hook at each downward movement of the latter.

In testimony whereof I affix my signature.

WILLIAM L. LENGEL.